(12) United States Patent
Dhanapal et al.

(10) Patent No.: US 10,225,747 B2
(45) Date of Patent: Mar. 5, 2019

(54) FREQUENCY PRUNING ENHANCEMENT FOR WIRELESS MEASUREMENTS

(71) Applicant: QUALCOMM Incorporated, San Diego, CA (US)

(72) Inventors: Muthukumaran Dhanapal, San Diego, CA (US); Daniel Amerga, San Diego, CA (US); Muralidharan Murugan, San Diego, CA (US); Nitin Pant, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 15/058,049

(22) Filed: Mar. 1, 2016

(65) Prior Publication Data

US 2016/0262030 A1    Sep. 8, 2016

Related U.S. Application Data

(60) Provisional application No. 62/127,258, filed on Mar. 2, 2015.

(51) Int. Cl.
*H04W 24/02* (2009.01)
*H04J 13/00* (2011.01)
(Continued)

(52) U.S. Cl.
CPC ......... *H04W 24/02* (2013.01); *H04J 13/0003* (2013.01); *H04W 24/10* (2013.01);
(Continued)

(58) Field of Classification Search
CPC ............ H04W 24/02; H04W 36/0061; H04W 72/0453; H04W 72/085; H04W 24/10
See application file for complete search history.

(56) References Cited

U.S. PATENT DOCUMENTS

| 8,929,237 B2 | 1/2015 | Jung et al. | |
|---|---|---|---|
| 2011/0051660 A1* | 3/2011 | Arora | H04W 48/14 370/328 |

(Continued)

FOREIGN PATENT DOCUMENTS

| EP | 2632205 A1 | 8/2013 |
|---|---|---|
| GB | 2493290 A | 1/2013 |

OTHER PUBLICATIONS

International Search Report and Written Opinion—PCT/US2016/020466—ISA/EPO—dated Jun. 22, 2016.

(Continued)

*Primary Examiner* — Edan Orgad
*Assistant Examiner* — Nourali Mansoury
(74) *Attorney, Agent, or Firm* — Arent Fox, LLP

(57) ABSTRACT

A method, an apparatus, and a computer program product for wireless communication are provided. The apparatus selects an LTE serving cell and a non-LTE serving cell. Measurement objects corresponding thereto are identified based on a review of broadcasted system information and historical information relating to prior serving cells. The apparatus identifies measurement objects from other radio access technologies (RATs) (WCDMA, CDMA, GSM). The remaining measurement objects may be identified based on measurement identifiers. The apparatus performs wireless measurements based on the selected serving cells and identified measurement objects. The resulting measurements are transmitted to the network for use in determining channel conditions.

55 Claims, 13 Drawing Sheets

(51) Int. Cl.
- *H04W 24/10* (2009.01)
- *H04W 36/00* (2009.01)
- *H04W 72/04* (2009.01)
- *H04W 72/08* (2009.01)
- *H04W 48/16* (2009.01)

(52) U.S. Cl.
CPC ....... *H04W 36/0061* (2013.01); *H04W 48/16* (2013.01); *H04W 72/0453* (2013.01); *H04W 72/085* (2013.01)

(56) References Cited

U.S. PATENT DOCUMENTS

| | | | | |
|---|---|---|---|---|
| 2011/0098046 | A1* | 4/2011 | Shin | H04W 48/16 455/436 |
| 2012/0322447 | A1* | 12/2012 | Ramachandran | H04W 48/18 455/436 |
| 2013/0051362 | A1* | 2/2013 | Lee | H04W 36/30 370/331 |
| 2013/0094424 | A1* | 4/2013 | Dhanda | H04W 48/12 370/312 |
| 2013/0225169 | A1* | 8/2013 | Farnsworth | H04W 60/04 455/436 |
| 2014/0286280 | A1 | 9/2014 | Seo et al. | |
| 2015/0146694 | A1 | 5/2015 | Gopal et al. | |
| 2015/0208303 | A1* | 7/2015 | Jung | H04W 8/08 455/436 |
| 2015/0289144 | A1 | 10/2015 | Yi et al. | |
| 2015/0296391 | A1 | 10/2015 | Kotkar et al. | |

OTHER PUBLICATIONS

3GPP TS 36.331: "3rd Generation Partnership Project, Technical Specification Group Radio Access Network, Evolved Universal Terrestrial Radio Access (E-UTRA), Radio Resource Control (RRC), Protocol specification (Release 12)", 3GPP Standard, 3rd Generation Partnership Project (3GPP), Mobile Competence Centre, vol. RAN WG2, No. V12.4.1, Jan. 7, 2015 (Jan. 7, 2015), pp. 1-410, XP050927575, 5.5 Measurements, 5.5.1 introduction, 5.5.2 Measurement Configuration, 5.5.3 Performing measurement, 5.5.3.1 General.

* cited by examiner

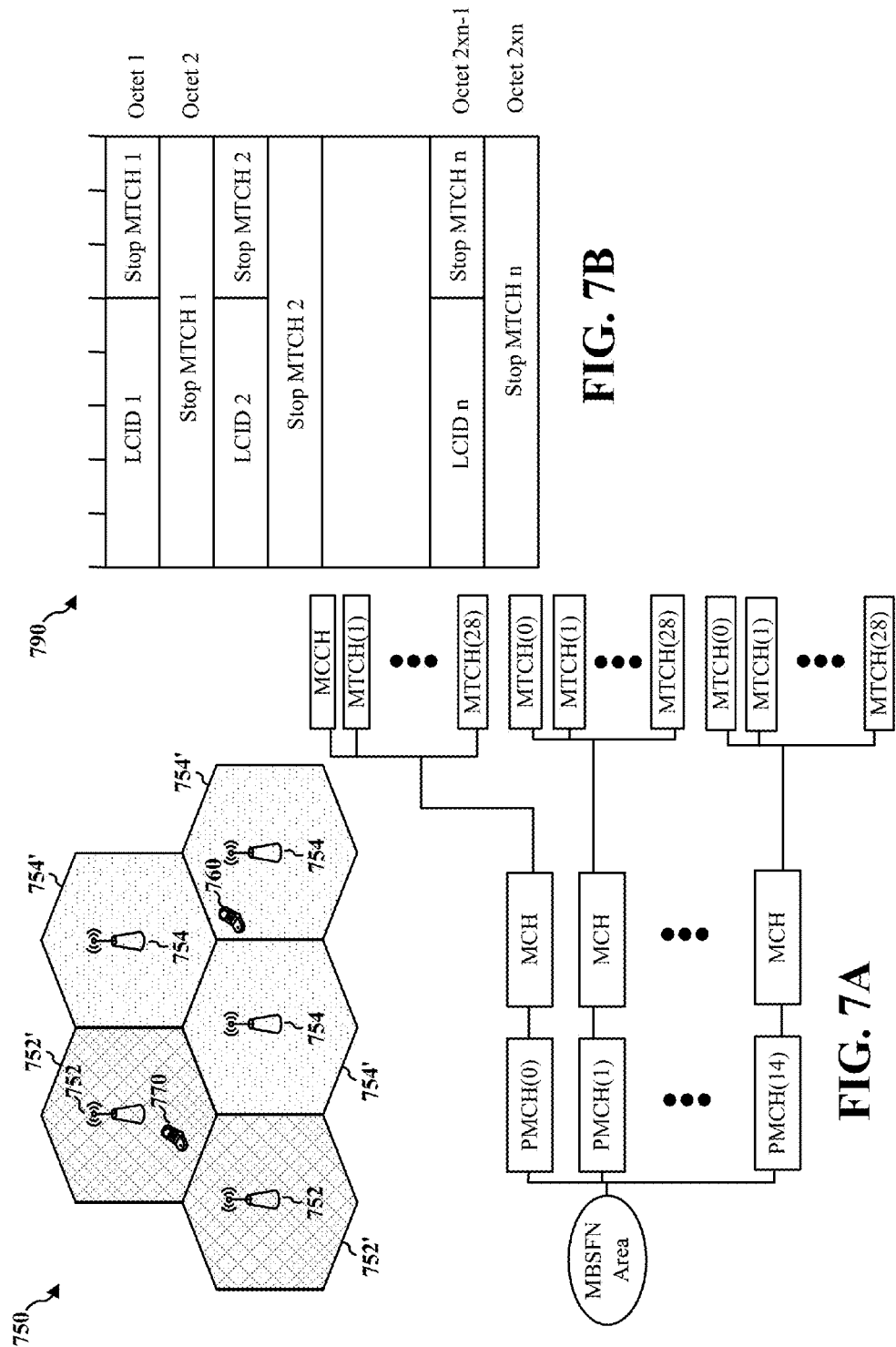

FREQUENCY PRUNING ENHANCEMENT FOR WIRELESS MEASUREMENTS

CROSS-REFERENCE TO RELATED APPLICATIONS

This application claims the benefit of U.S. Provisional Application Ser. No. 62/127,258, entitled "FREQUENCY PRUNING ENHANCEMENT FOR WIRELESS MEASUREMENTS" and filed on Mar. 2, 2015, which is expressly incorporated by reference herein in its entirety.

BACKGROUND

Field

The present disclosure relates generally to communication systems, and more particularly, to a technique for improving quality in wireless communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In connection with a prospective cell scheduling, reselection, handover or other such event, a user equipment in a radio resource control (RRC) connected mode in LTE may perform measurements on different frequencies using identified measurement objects in order to provide the network with feedback so that channel conditions can be assessed. Ordinarily, the network provides a dedicated list of candidate frequencies to the UE as a basis for the UE to identify the measurement objects. If the number of candidate frequencies exceeds a threshold that the UE is capable of measuring at once, the UE may identify measurement objects based on less useful information, such as measurement object identifiers. The result is that frequencies that may otherwise be optimal candidates for cell reselection are often left unconsidered.

SUMMARY

In an aspect of the disclosure, an apparatus, user equipment, method, a computer readable-medium are provided.

In one aspect of the disclosure, a method for wireless communication includes initiating pruning of one or more candidate frequencies relating to a possible cell reconfiguration, including selecting at least one wireless serving cell, and selecting, based on a data source, at least one wireless non-serving cell, the data source including broadcasted system information, and historical information for at least one prior serving cell, identifying a plurality of measurement objects corresponding to the selected at least one wireless serving and non-serving cells, and performing wireless measurements based on the selected at least one wireless serving and non-serving cells and the identified measurement objects to produce at least one measured value.

In another aspect of the disclosure, an apparatus includes a memory, and at least one processor coupled to the memory and configured to initiate pruning of one or more candidate frequencies relating to a possible cell reconfiguration, including selecting at least one wireless serving cell, and selecting, based on a data source, at least one wireless non-serving cell, the data source including broadcasted system information, and historical information for at least one prior serving cell, identify a plurality of measurement objects corresponding to the selected at least one wireless serving and non-serving cells, and perform wireless measurements based on the selected at least one wireless serving and non-serving cells and the identified measurement objects to produce at least one measured value.

In another aspect of the disclosure, an apparatus includes means for initiating, in a Radio Resource Control (RRC) connected mode, pruning of one or more candidate frequencies relating to a possible cell reconfiguration, including selecting at least one wireless serving cell, and selecting, based on a data source, at least one wireless non-serving cell, the data source including historical information for at least one prior serving cell and broadcasted system information, means for identifying a plurality of measurement objects corresponding to the selected at least one wireless serving and non-serving cells, and means for performing wireless measurements based on the selected at least one wireless serving and non-serving cells and the identified measurement objects to produce at least one measured value.

In another aspect of the disclosure, a non-transitory computer-readable medium storing computer executable code for wireless communication, includes code for initiating pruning of one or more candidate frequencies relating to a possible cell reconfiguration, including selecting at least one wireless serving cell, and selecting, based on a data source, at least one wireless non-serving cell, the data source including broadcasted system information, and historical information for at least one prior serving cell, identifying a plurality of measurement objects corresponding to the selected at least one wireless serving and non-serving cells, and performing wireless measurements based on the selected at least one wireless serving and non-serving cells and the identified measurement objects to produce at least one measured value.

It is understood that other aspects of apparatus and methods will become readily apparent to those skilled in the art from the following detailed description, wherein various aspects of apparatus and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

FIG. 7A is a diagram illustrating an example of an evolved Multimedia Broadcast Multicast Service channel configuration in a Multicast Broadcast Single Frequency Network.

FIG. 7B is a diagram illustrating a format of a Multicast Channel Scheduling Information Media Access Control control element.

DETAILED DESCRIPTION

Figure 1:
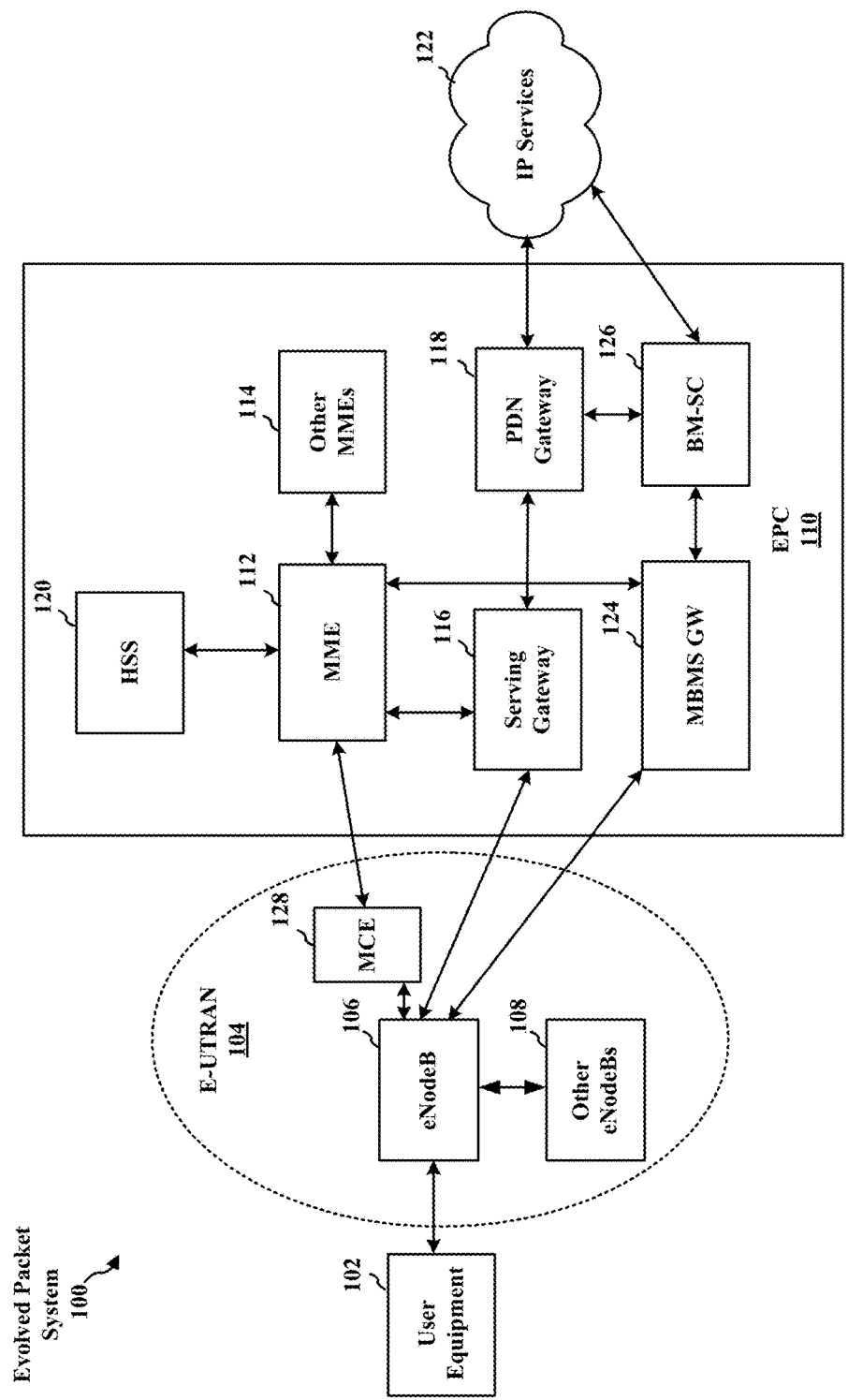
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
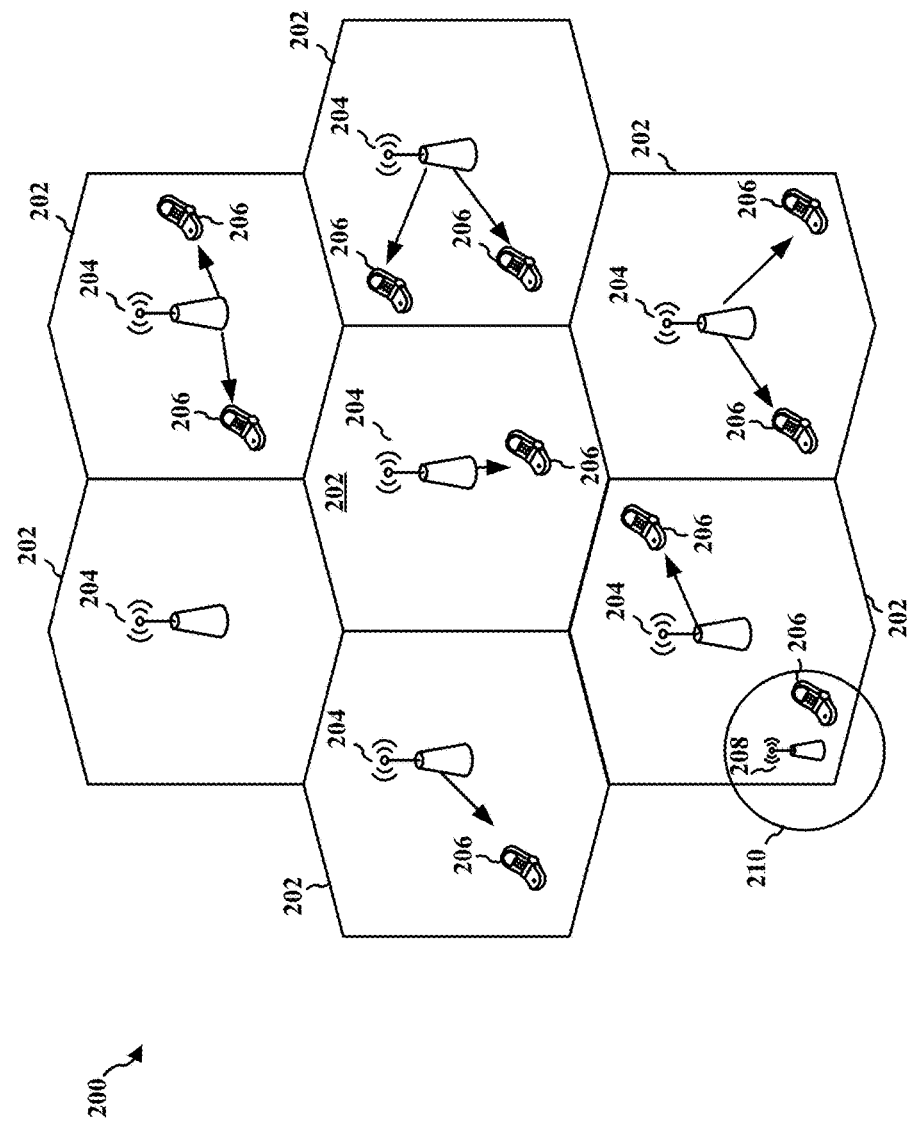
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
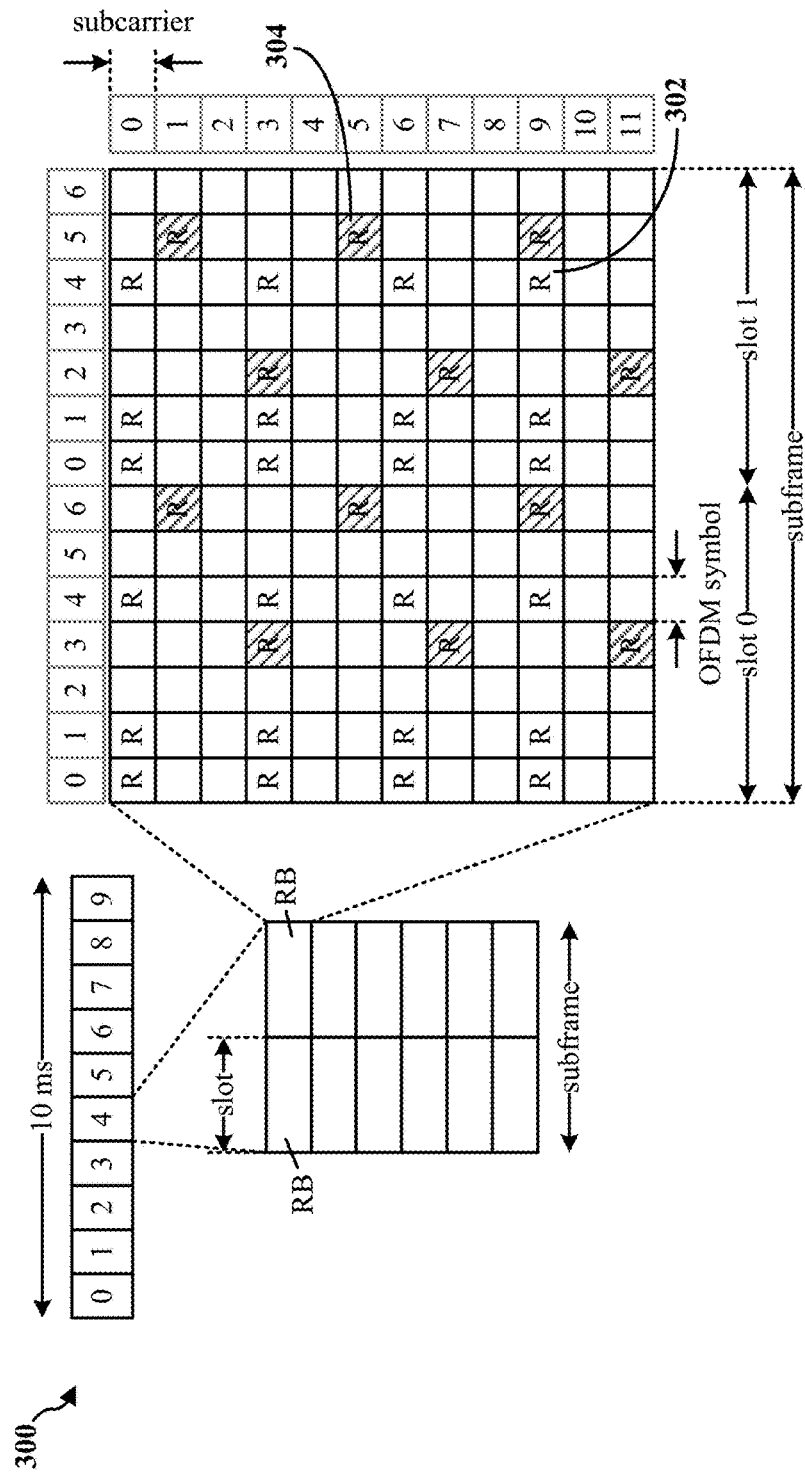
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
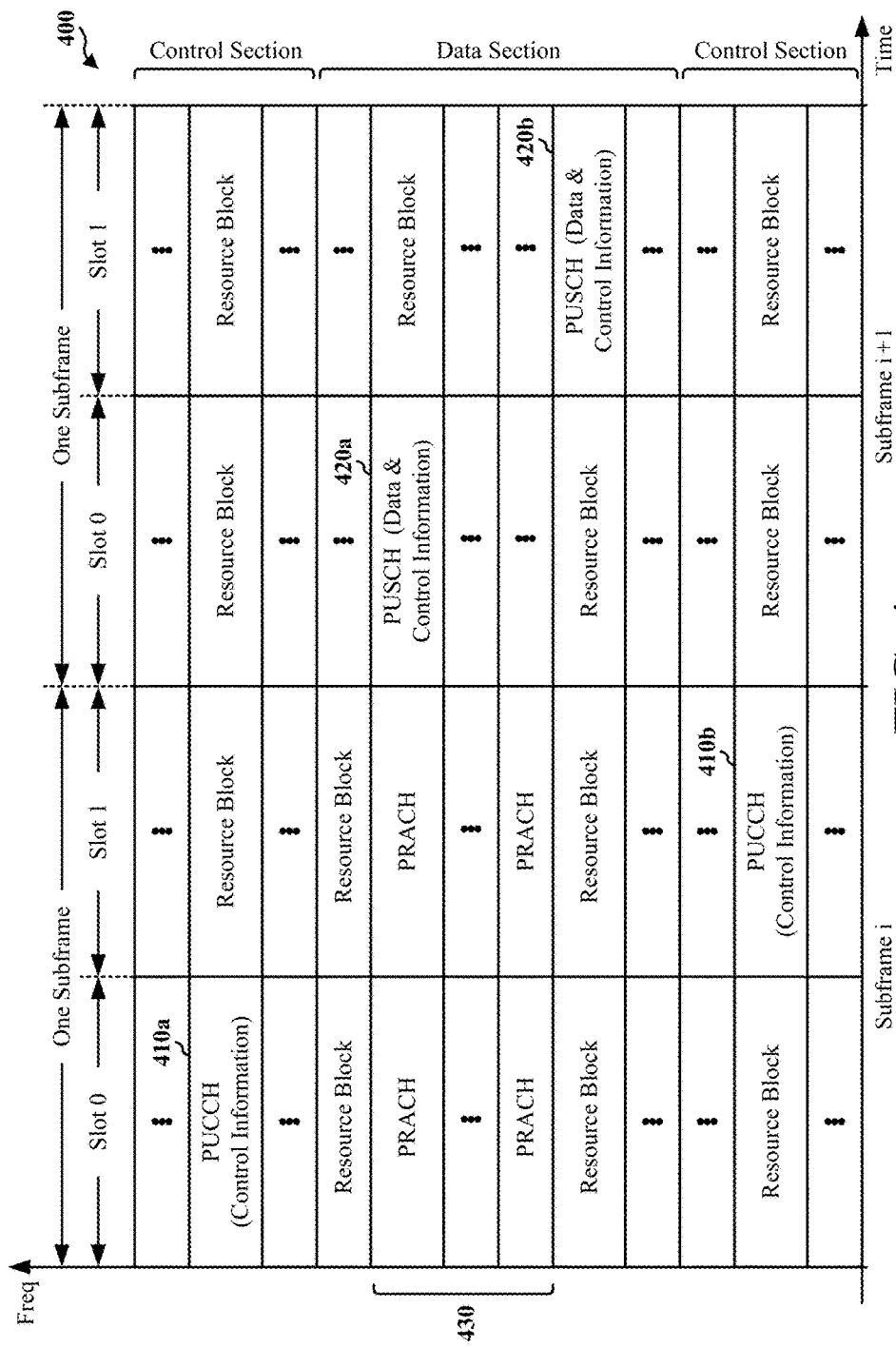
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
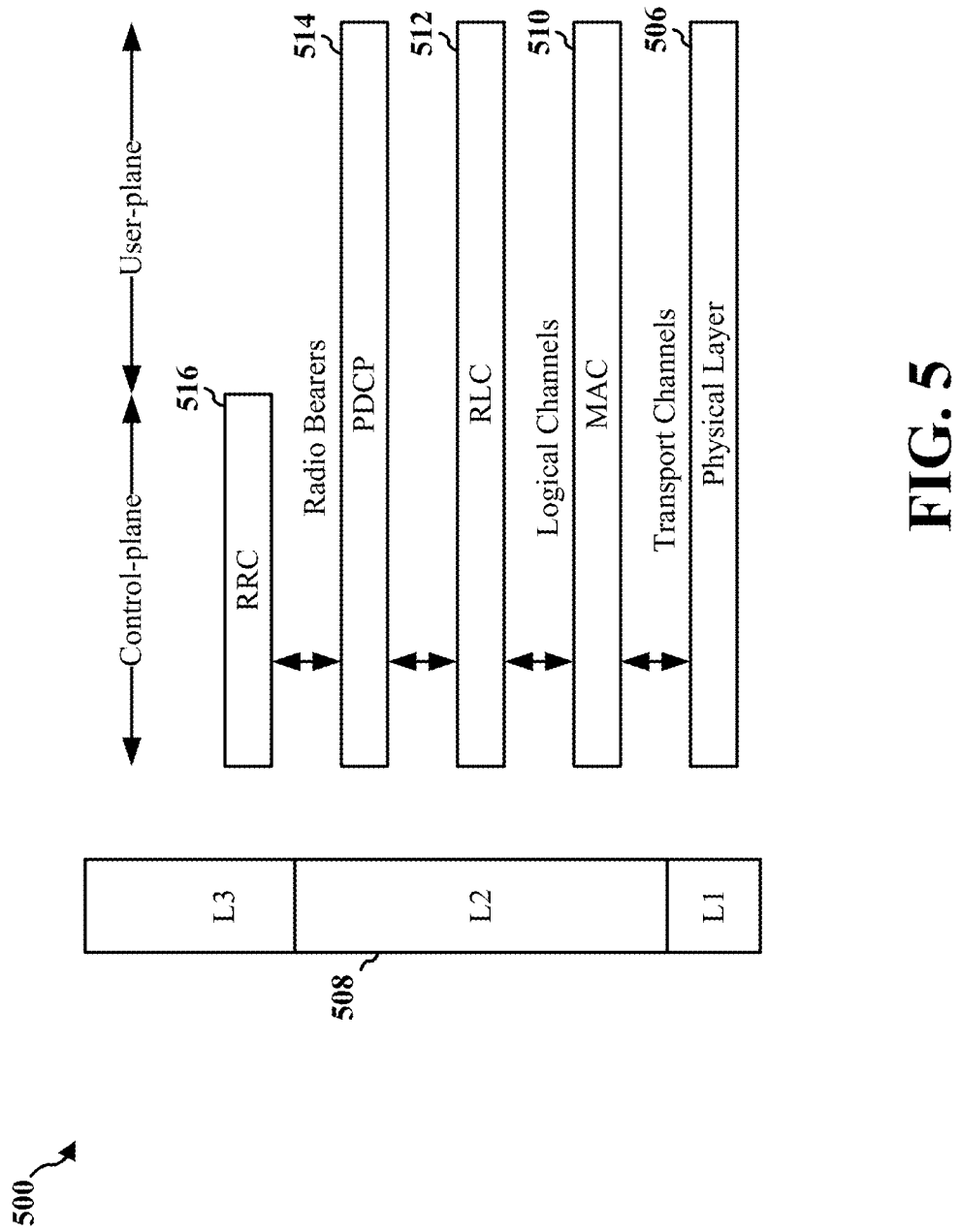
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
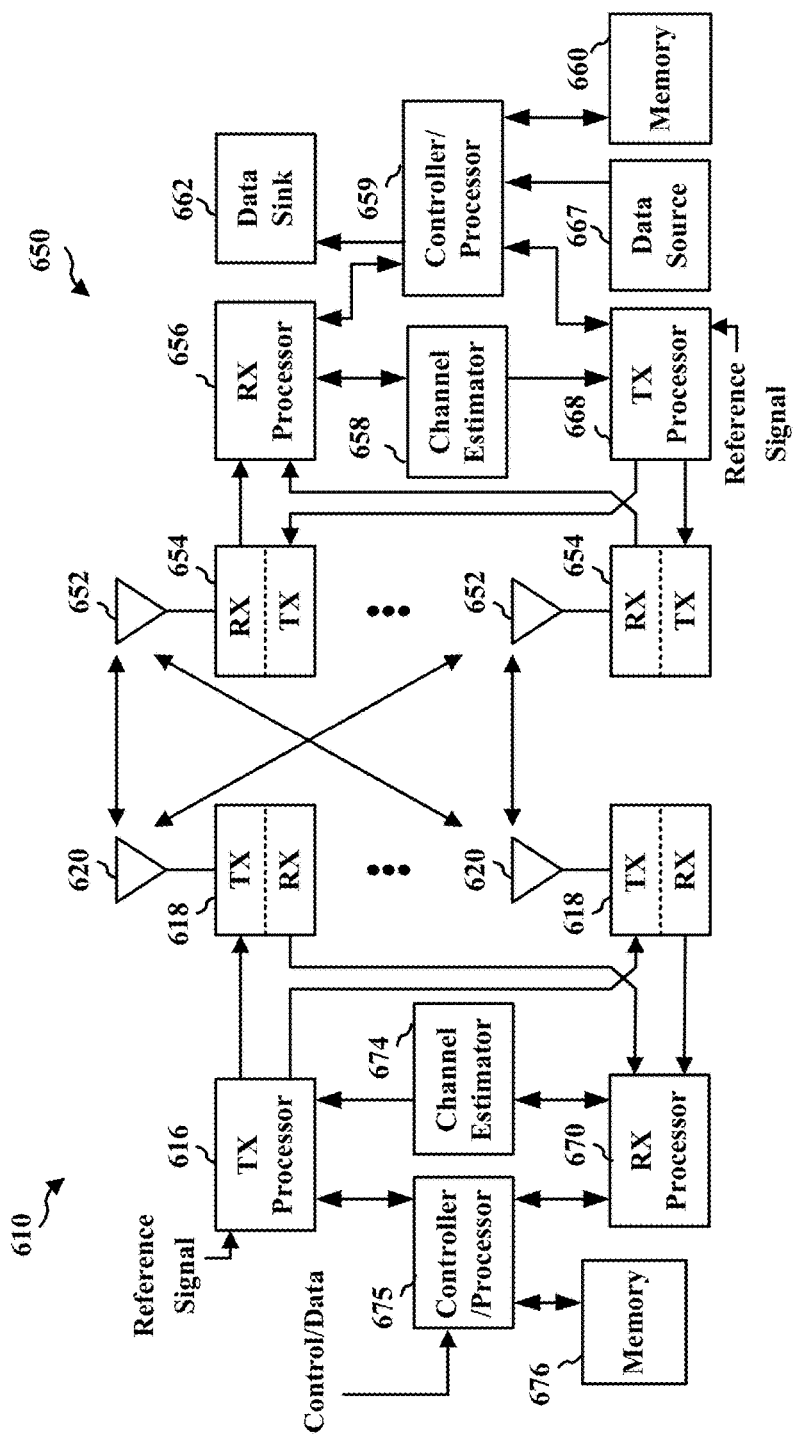
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports one or more physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. Initially, the UE may acquire a system information block (SIB) 13 (SIB13). Subsequently, based on the SIB13, the UE may acquire an MBSFN Area Configuration message on an MCCH. Subsequently, based on the MBSFN Area Configuration message, the UE may acquire an MCH scheduling information (MSI) MAC control element. The SIB13 may include (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

Carrier Aggregation

UEs may use spectrum up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments conserve spectrum and are a good fit for the typically asymmetric bandwidth utilization by broadband subscribers.

Carrier Aggregation Types

Figure 8A:
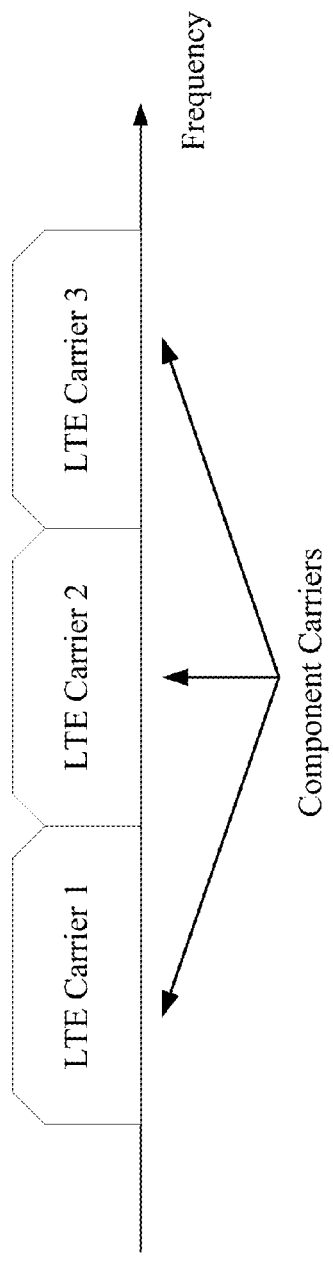
FIG. 8A is a diagram illustrating an example of continuous carrier aggregation.
Figure 8B:
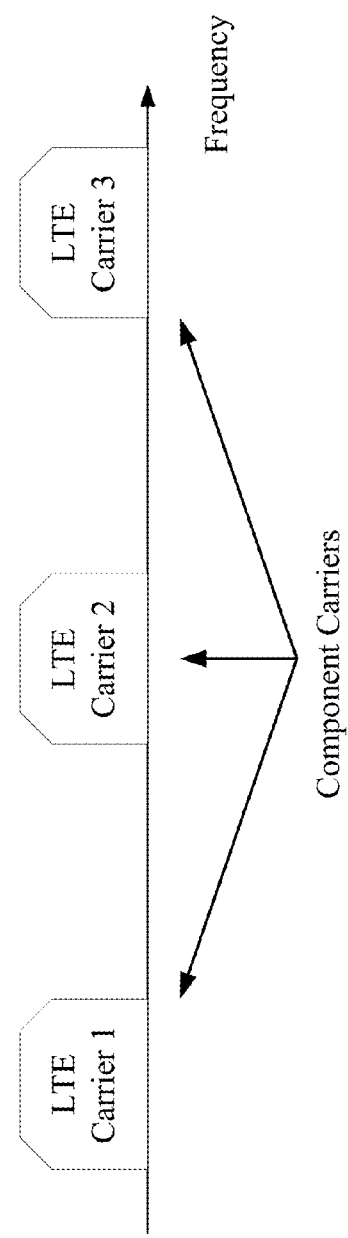
FIG. 8B is a diagram illustrating an example of non-continuous carrier aggregation.

Two types of carrier aggregation (CA) methods have been proposed, continuous CA and non-continuous CA. The two types of CA methods are illustrated in FIGS. 8A and 8B. Non-continuous CA occurs when multiple available component carriers are separated along the frequency band (FIG. 8B). On the other hand, continuous CA occurs when multiple available component carriers are adjacent to each other (FIG. 8A). Both non-continuous and continuous CA aggregates multiple LTE/component carriers to serve a single UE.

Frequency Pruning

The increased intelligence of UEs and the growing complexity of the air interface have increased the need for more detailed communication between the UE and the network about the available cells in the event of a prospective cell scheduling, reselection, handover or other such event. In the context of LTE, communication between the network and the UE regarding these issues is discussed in the following standard: *LTE; Evolved Universal Terrestrial Radio Access (E-UTRA); Radio Resource Control (RRC); Protocol specification* (3*GPP TS* 36.331 *version* 10.5.0 *Release* 10). One objective is to find a cell with the highest communication quality such that maximum performance in wireless communications can be achieved. In order to identify such cells, the eNB may obtain certain data from the UE, analyze the data, and then adjusts its downlink transmissions accordingly. The data may include, for example, an identification of cells the UE recognizes, the quality and strength of transmissions from that cell, the UE's present channel conditions, information about transmission modes and antennas, and any other relevant information requested by the network. In response to requests from the network, the UE may issue a measurement report to provide the network with such data and measurements. Such measurements are often made to adjacent or nearby cells, but can also include any relevant UE parameters.

The UE learns the requested information from the network using a measurement configuration. When a UE is in RRC_CONNECTED mode, this measurement configuration is provided to the UE by means of dedicated signaling. For instance, an RRCConnectionReconfiguration message may be transmitted from the eNB to the UE. The measurement configuration provided to the UE may include various parameters, discussed below.

An RRCConnectionReconfiguration message is the command to modify an RRC connection. The purpose of this procedure is to establish, modify or release Radio Bearers to perform Handover, to setup/modify/release measurements, or to add/modify/release Serving cells (SCells). In addition, dedicated Non-Access Stratum (NAS) information may be transferred from the eNB to the UE using this message.

The measurement configuration includes measurement objects, which constitute the frequencies and cells on which the UE is designated to perform measurements. Measurement objects include intra- and inter-frequency LTE neighbors, as well as other Radio Access Technologies (RATs), including (if the UE is configured to receive wireless service from other RATs) Intra- and Inter-RAT (IRAT) UMTS neighbors, IRAT GSM neighbors and IRAT CDMA2000 HRPD and 1×RTT neighbors. The measurement configuration further includes reporting configurations, which constitute the factors used by the UE to provide a measurement report and the parameters that the UE includes in the report. In addition, the measurement configuration may include measurement identities, or identifiers that link a measurement object with a reporting configuration. In other words, the UE needs to keep track of the objects to be measured and their specific triggers. The measurement identity is used as a reference number in the measurement report. Other parameters of the measurement configuration include quantity configurations, which represent the measurement quantities used in the measurements and reporting on a per-RAT basis, and measurement gaps, which represent time periods that the UE may use to perform measurements while in connected mode.

Measurement reports can be event-triggered or periodical. Event-based measurement reports may be transmitted by the UE under various circumstances. Examples may include when a serving cell, a primary cell, or an IRAT neighbor becomes better or worse than a predetermined threshold, when a neighbor cell becomes better than the primary cell, and the like. Further, periodical measurement reports may be transmitted to the network based on periods and parameters designated in the reporting configuration.

Figure 9:
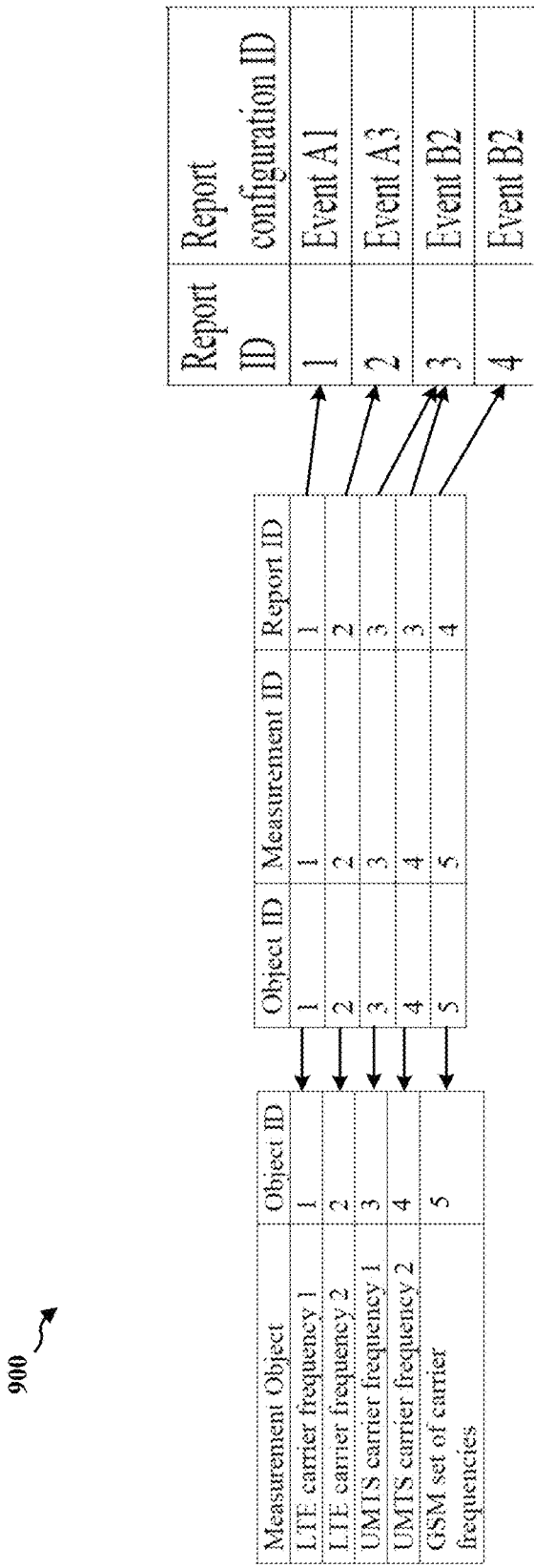
FIG. 9 is an illustration of a measurement configuration message.

FIG. 9 is an illustration 900 of a measurement configuration message. The message is sent by the eNB to the UE. The message includes a set of measurement objects, which in this example includes LTE carrier frequencies 1 and 2 corresponding to Object IDs 1 and 2, respectively, UMTS carrier frequencies 1 and 2 corresponding to Object IDs 3 and 4, respectively, and a GSM set of carrier frequencies corresponding to Object ID 5. In turn, each of Object IDs 1-5 is mapped to respective Measurement IDs 1-5. Measurement IDs 1 and 2 are mapped to Report IDs 1 and 2, respectively. Measurement IDs 3 and 4 are mapped to Report ID 3. Measurement ID 5 is mapped to Report ID 4. As indicated by the arrows, each of Report IDs 1-4 is mapped to a Report Configuration ID. A Reporting Configuration reports to the UE criteria (whether periodic or event-driven) that causes the UE to send a measurement report and details on what information to expect the UE to report (i.e., quantities such as incoming received power for LTE, signal code power (RSCP) for UMTS, the number of cells, etc.). As an illustration of the Reporting Configuration ID, Event A1 may correspond to a case where the serving cell becomes better than a defined threshold. Event A2 (not shown) may correspond to a case where the serving cell becomes worse than a threshold. Event A3 may correspond to a case where a neighbor cell becomes some offset better than the primary cell. Event B2 may correspond to a case where a primary cell becomes worse than a defined threshold and an inter-RAT neighbor becomes better than a second threshold. This means that in FIG. 9, when the UE has recognized a condition where event B2 is triggered, the UE will send a measurement report to the eNB which includes at least measurements of the UMTS carrier frequencies 1 and 2 and the GSM set of carrier frequencies, thereby apprising the eNB of the current channel conditions.

Figure 10:
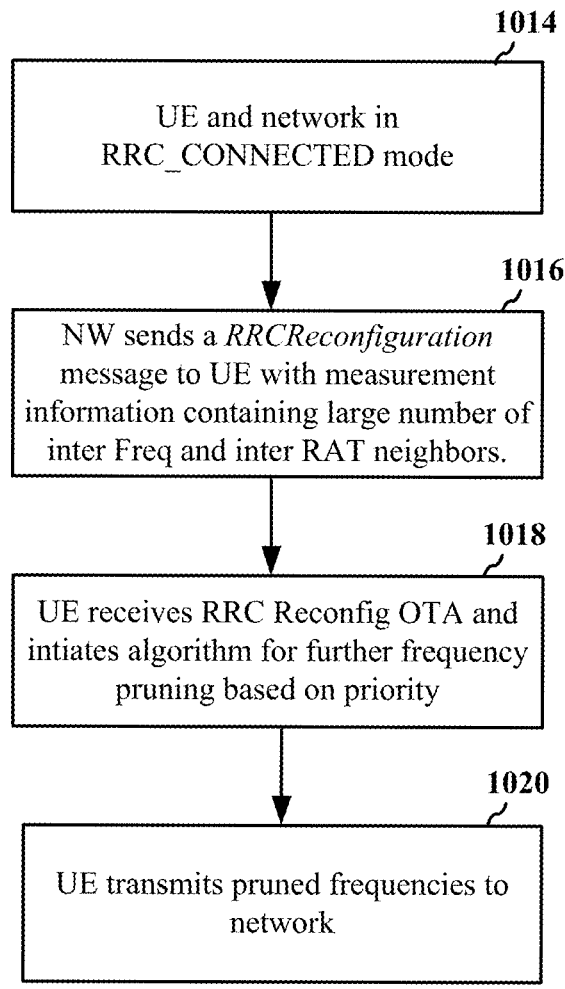
FIG. 10 is a flow chart of a method of wireless communication.

FIG. 10 is a flow chart 1000 of a method of wireless communication. While shown is a method used in the context of an LTE network, the principles disclosed herein can be equally applied to any suitable wireless technology or network configuration, including, for example, systems based on the principles of CDMA, TDMA, FDMA, etc. The UE and the network are in an RRC_CONNECTED mode. A UE is in RRC_CONNECTED when an RRC connection has been established (1014). If this is not the case, i.e. no RRC connection is established, the UE may be in RRC_IDLE state. The network sends an RRCConnectionReconfiguration message with measurement-related information, as discussed above (1016).

In the case of LTE, the RRCConnectionReconfiguration message identifies a large number of inter-frequency and inter-RAT neighbors as part of measurement configuration. With the existing implementation, the presence of too many inter-frequency and inter-RAT neighbors creates a problem such that other frequencies from LTE or other RATs that may be good candidate frequencies for establishing a connection otherwise may be omitted from the measurements. As an example, conventional algorithms may simply schedule measurement of a maximum of a predetermined number of measurement objects (e.g., 10) for the serving cell based only on a valid measurement ID. Then a smaller maximum number (e.g., 5) of non-serving LTE measurement objects may be scheduled. In this technique, pruning, or paring down, of the large number of candidate measurements is based on measurement object ID, resulting in the exclusion of potentially strong candidate inter-frequency and inter-RAT neighbors.

In one aspect of the disclosure, a UE in RRC connected mode initiates further pruning of candidate cells based on a review of data obtained from both broadcasted system information and a local cache of historical information of prior serving cells. The broadcasted system information may, for example, include data in one or more of the system information blocks broadcast by the network. The historical information may be included in an acquisition database of the UE.

Accordingly, in the prioritization scheme as disclosed herein, when the UE receives the RRCConnectionReconfiguration message, the UE initiates an algorithm for further frequency pruning based on priority (1018). Frequency pruning refers to refining a set of candidate frequencies or cells for use in an event such as a cell reconfiguration (e.g., cell selection, reselection, handover, cell selection, cell scheduling etc.). Pruning begins with identifying cells and frequencies on which to perform measurements. An illustration of this algorithm is depicted with reference to FIG. 11. The UE then may transmit the pruned frequencies and corresponding measurements back to the network (1020).

Figure 12:
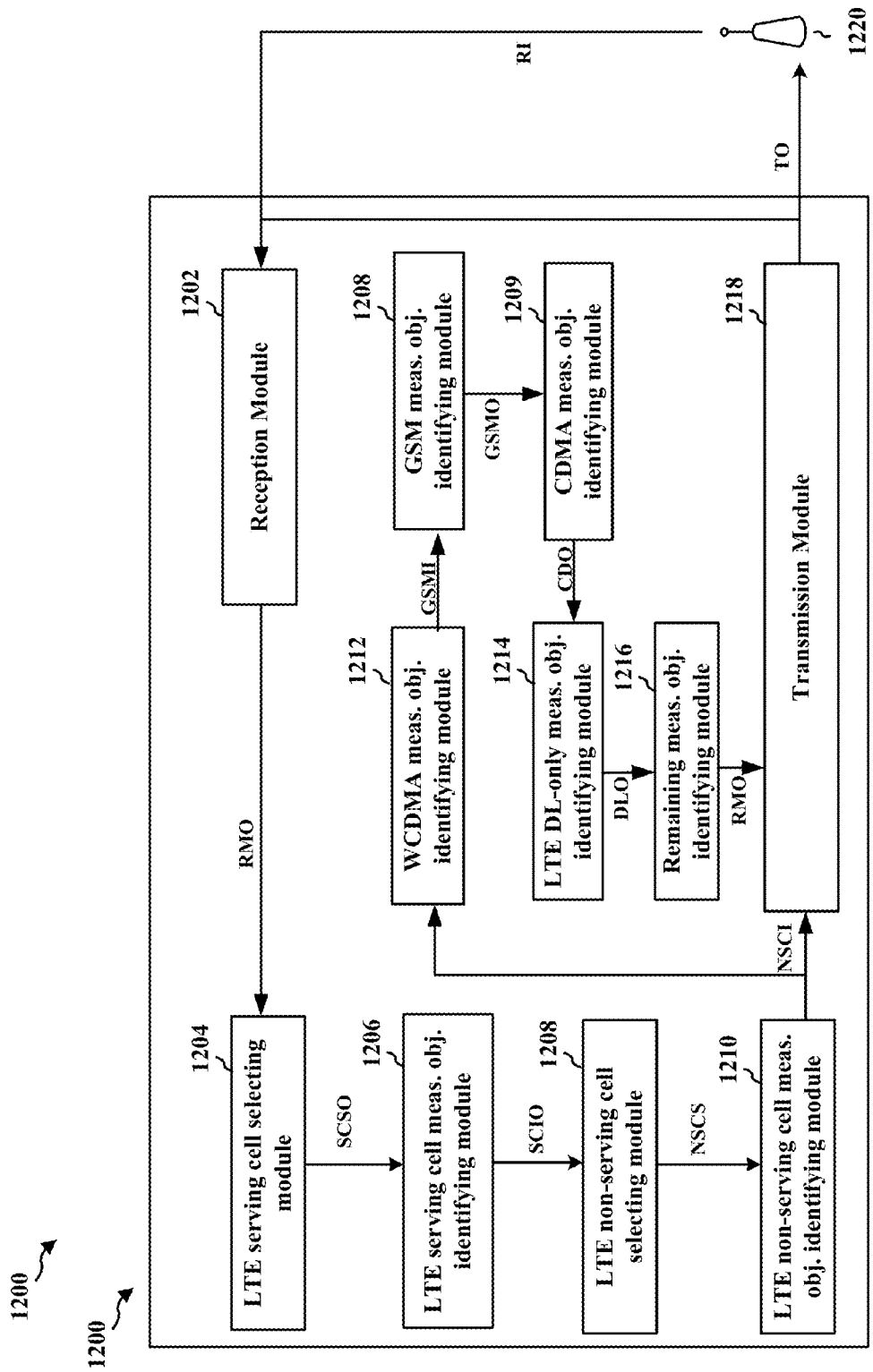
FIG. 12 is a conceptual data flow diagram illustrating the data flow between different modules/means/components in an exemplary apparatus.
Figure 13:
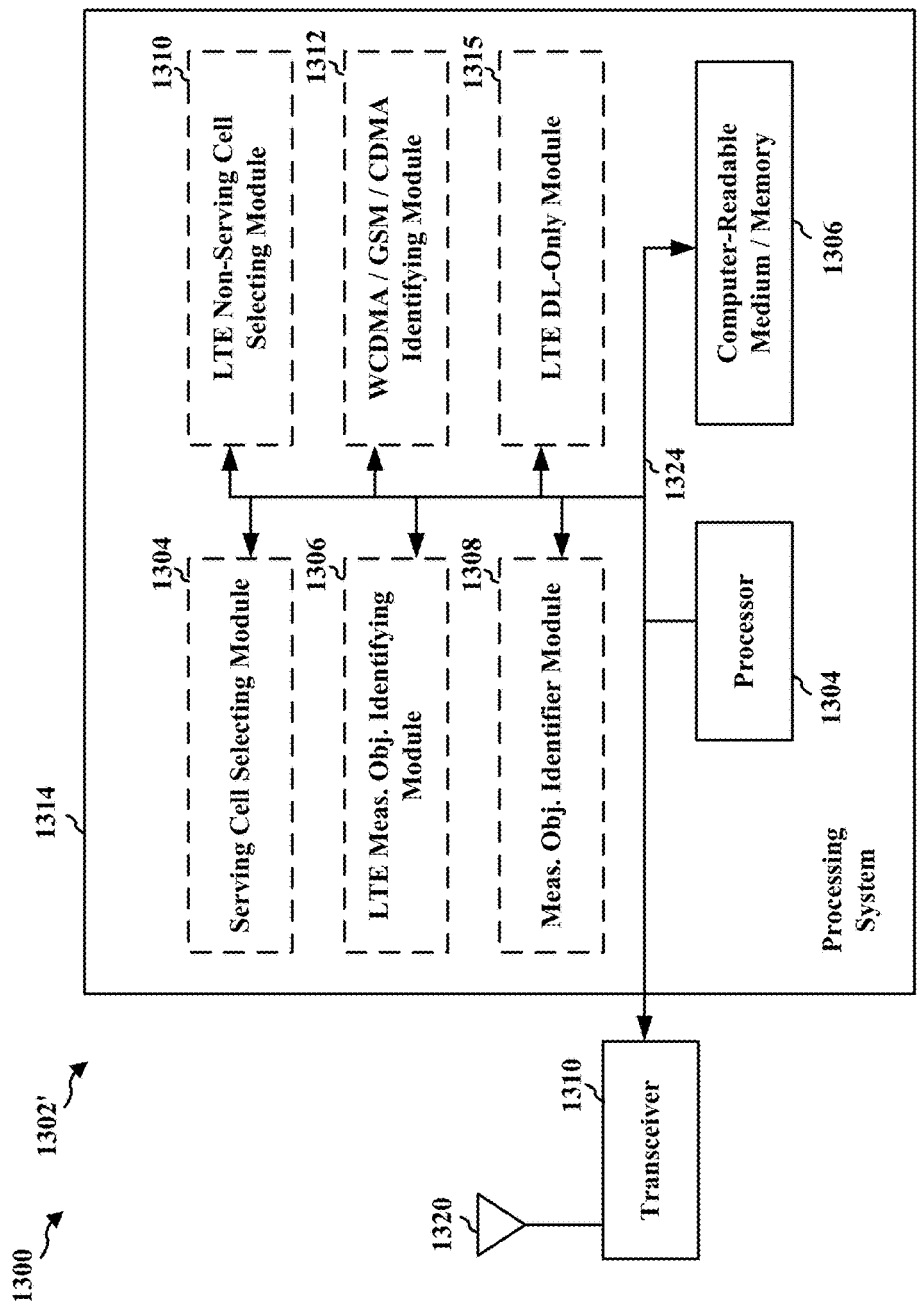
FIG. 13 is a diagram illustrating an example of a hardware implementation for an apparatus employing a processing system.

The method as disclosed herein may be performed by a mobile station, or handheld or portable device, or in the case of LTE, a UE, e.g., the UE 206 (FIG. 2), the apparatus 1200 (FIG. 12) and 1300 (FIG. 13). In an aspect of frequency pruning, measurement objects and candidate cells may be selected on the basis of (1) broadcasted system information, and/or (2) historical information corresponding to prior serving cells. With reference to (1), the UE may use information in the various SIBs, as shown. In addition, or alternatively, and with reference to (2), measurement objects and cells may be gleaned from information in a database such as a cache of prior serving cells (e.g., an acquisition database) or a cache of prior serving cells from another RAT.

Figure 11:
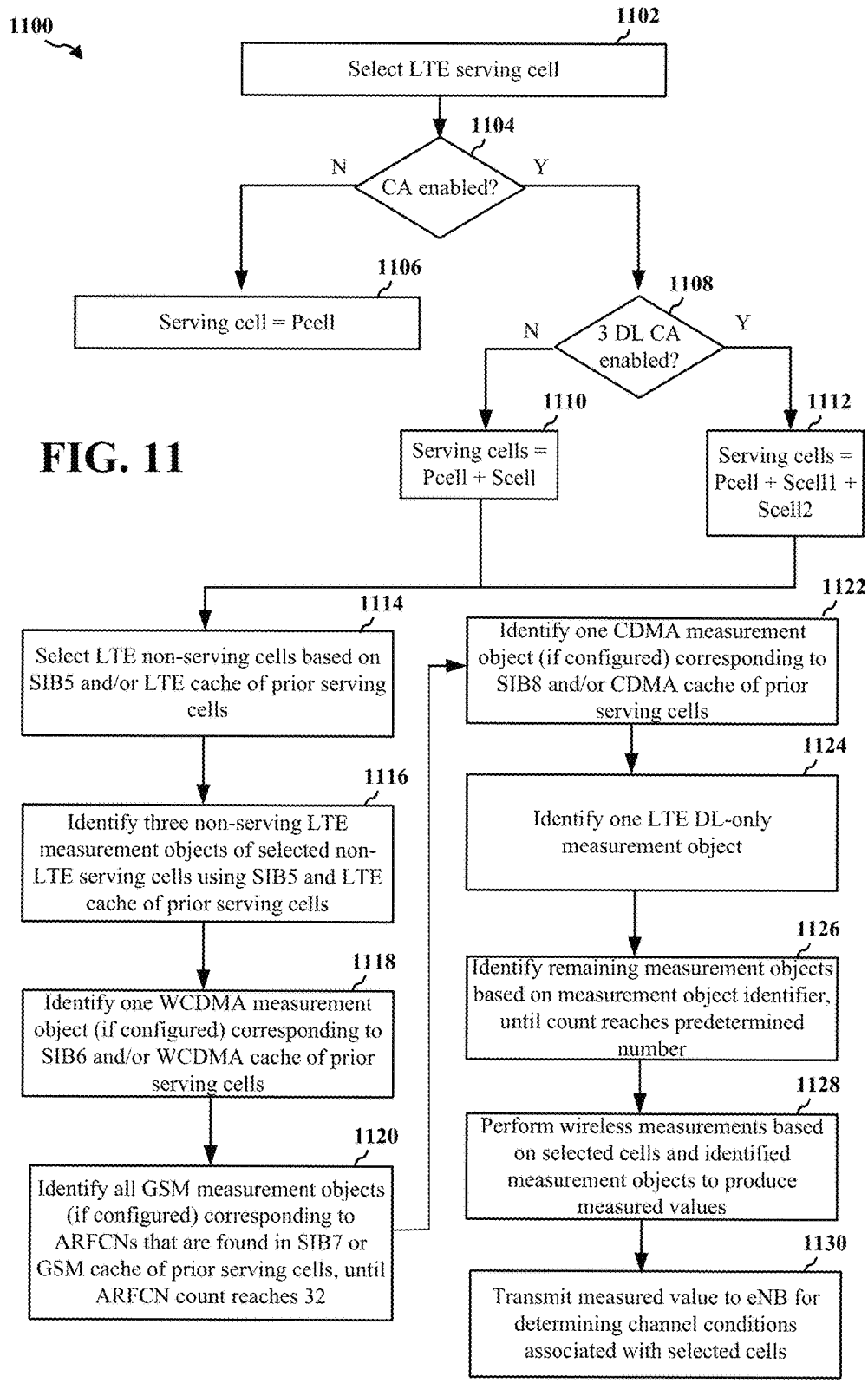
FIG. 11 is a flow chart of a method of wireless communication.

FIG. 11 is a flow chart of a method of wireless communication. While the illustration of FIG. 11 is performed by a UE in the context of an LTE system, it will be appreciated by one skilled in the art that the principles of the present disclosure can be equally applied to another wireless access technology. Here it is assumed that the UE has received an RRC Connection Reconfiguration message from the network, although another equally suitable triggering event may occur depending on the RAT and the wireless network topology. At 1102, the UE selects an LTE serving cell as follows. The UE determines whether carrier aggregation (CA) is enabled (1104). If not, then the serving cell is the primary cell (1106). If CA is enabled, but not 3 DL CA (1108), then the serving cell is the primary cell and a secondary cell (1110). If 3 DL CA is enabled, then the serving cell is the primary cell and first and second secondary cells (1112).

Thereupon, at 1114, the UE selects LTE non-serving cells based on SIB5 and/or an LTE cache of prior serving cells. At 1116, the UE identifies three measurement objects associated with one or more LTE non-serving cells based on whether the frequency corresponding to the measurement object is found in SIB5 or in a cache of prior serving cells. In some configurations steps 1114 and 1116 may be performed concurrently. Like the other system information blocks, SIB5 is broadcast by the network over logical channel BCCH to the UE. This logical channel information is further carried over transport channel BCH or carried by DL-SCH. SIB5 contains information for cell reselection and handover and includes Inter-frequency neighbors (cells on different frequencies), E-UTRA LTE frequencies, and other neighbor cell frequencies from other RATs. In addition, by retrieving information from the LTE cache of prior serving cells, the UE may take historical information about the LTE cells into account and use that information in the scheduling of measurements and/or preparation of the measurement report. In one configuration, the UE may look for sequences of measurement object frequencies that exist in SIB5 before looking for measurement object frequencies found in the cache of prior serving cells and identify ones that are present in either of those. This step may be performed a designated number of times (e.g., three) until the desired number (e.g., three) measurement objects are identified. In this step the UE is able to identify measurements for providing information about the neighbors being served by the current serving cell (from SIB5) as well as historical information about prior serving cells (from the LTE cache of prior serving cells).

At 1118, upon determining that the UE is configured for WCDMA, the UE identifies one WCDMA measurement object corresponding to SIB6 or a WCDMA cache of prior serving cells. SIB6 contains information relating to UTRA neighboring cells for cell re-selection. SIB6 includes cell re-selection parameters which are common for a UTRA frequency. The WCDMA database of prior cells may likewise include historical information relating to WCDMA services. At 1120, the UE identifies all GSM measurement objects (assuming the UE is configured for GSM) until the Absolute Radio Frequency Channel Number (ARFCN) count reaches 32. The ARFCN is a unique number given to each radio channel in GSM. The ARFCN can be used to calculate the exact frequency of the radio channel.

At 1122, upon determining that the UE is configured for CDMA, the UE identifies one CDMA measurement object corresponding to SIB8 or a CDMA database caching prior serving cell information. SIB8 contains information for iRAT cell reselection to eHRPD (evolved High Rate Packet Data, which is the 1xEV-DO Rev.A with the support of connectivity to Evolved Packet Core of LTE), such as CDMA-2000 EVDO frequencies and CDMA-2000 neighbor cell frequencies.

At 1124, the UE identifies one LTE downlink (DL)-only measurement object. An example of an LTE DL-only band is New Band LTE Downlink FDD 716-728 MHz (Band 29). If, by the time in the process the count of identified measurement objects has not yet reached a predetermined number such as 10, then the UE identifies the remaining measurement objects on the basis of a valid measurement object identifier until the count reaches a predetermined number such as 10 (1126). Thereupon, at 1128, the UE transmits the measurement objects—for example, as part of a measurement report (described above)—to the eNB.

In the illustration of FIG. 11, the steps may be performed in order of priority of the most desired potential cells and channels downward. The UE is able to take into account measurements from other RATs that otherwise may have been neglected if measurement objects were selected arbitrarily based solely on measurement object identifiers. In addition, using the technique disclosed herein, the UE is able to use broadcasted system information and cached historical information to determine a priority to select candidate frequencies and cells. Because better decisions can be made about a reconfiguration (e.g. cell selection, reselection, handover, etc.), the quality and efficiency of wireless transmissions can be improved.

The technique need not rigidly follow the steps in FIG. 11. For example, a prioritization technique may be taken into account which includes only specific steps in the algorithm, such as, among others, 1102, 1114, and 1126. Numerous other sequences can be contemplated. In other configurations, the algorithm may omit one or more of steps 1102, 114, 1116, 1118, 1120, 1122, 1124, or 1126. Additionally, the algorithm may be performed in a different order depending on various factors such as the type of RAT in which these principles are applied.

FIG. 12 is a conceptual data flow diagram 1100 illustrating the data flow between different modules/means/components in an exemplary apparatus. The data flow described in FIG. 12 is merely exemplary and is not intended to be limiting. The apparatus may be an UE. The apparatus includes a reception module 1202 that receives downlink transmissions over R1 from eNB 1220. Reception module 1202 may communicate with LTE serving cell selecting module 1204 via RMO. LTE serving cell selecting module 1204 selects LTE serving cells as described with respect to FIG. 11. This information is made available via SCSO to LTE serving cell measurement object identifying module 1206, which identifies one or more measurement objects associated with the selected LTE serving cells. Control is passed via SCIO to LTE non-serving cell selecting module 1208, where LTE non-serving cells are selected. The information is provided via NSCS to LTE non-serving cell measurement object identifying module 1210 where one or more measurement objects associated with the selected non-serving cells are identified. From module 1210 the information may be sent to transmission module 1218 for transmission via TO to eNB 1220, or alternatively the data may be passed to WCDMA measurement object identifying module 1212, where measurement objects corresponding to a supported WCDMA cell are identified. The information is passed via GSMI to GSM measurement object identifying module 1208. At module 1208, the eNB identifies measurement objects corresponding to supported CDMA cells. Thereafter, through GSMO the information is provided to CDMA measurement object identifying module 1209, at which measurement objects associated supported CDMA cells are identified. The information is provided via CDO to LTE DL-only measurement object identifying module 1216, wherein the UE identifies one or more measurement objects of corresponding LTE downlink-only channels. The information is provided via RMO to transmission module 1218 for transmission as part of a measurement configuration message over TO to UE 1220.

The apparatus may include additional modules that perform each of the blocks of the algorithm in the aforementioned flow charts of FIGS. 10 and 11. As such, each block in the aforementioned flow chart of FIGS. 10 and 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

FIG. 13 is a diagram 1300 illustrating an example of a hardware implementation for an apparatus 1302' employing a processing system 1314. The apparatus may be a portable device or UE. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1304, 1306, 1308, 1310, 1312, 1315 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1220, extracts information from the received signal, and provides the extracted information to the processing system 1314. In addition, the transceiver 1310 receives information from the processing system 1314, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The processing system may further include at least one processor configured to perform the functions recited herein. The computer-readable medium/memory 1306 may also be used for storing data that is manipulated by the processor 1304 when executing software. The processing system further includes at least one of the modules 1304, 1306, 1308, 1310, 1312 and 1315. The modules may be software modules running in the processor 1304, resident/stored in the computer readable medium/memory 1306, one or more hardware modules coupled to the processor 1304, or some combination thereof. The processing system 1314 may be a component of the UE 650 (FIG. 6) and may include the memory 660 and/or at least one of the TX processor 668, the RX processor 656, and the controller/processor 659.

In one configuration, the apparatus 1302' for wireless communication includes means for selecting at least one wireless serving cell, means for selecting at least one wireless non-serving cell based on a data source, means for identifying a plurality of measurement objects corresponding to the selected at least one wireless serving and non-serving cells, means for performing wireless measurements based on the selected at least one wireless serving and non-serving cells and the identified measurement objects to produce at least one measured value, and means for transmitting the at least one measured value to a base station for use in determining channel conditions associated with the selected at least one wireless serving and non-serving cells. The aforementioned means may be one or more of the aforementioned modules of the apparatus 1302' and/or the processing system 1314 of the apparatus 1302' configured to perform the functions recited by the aforementioned means. As described supra, the processing system 1314 may include the TX processor 668, the RX processor 656, and the controller/processor 659. As such, in one configuration, the aforementioned means may be the TX Processor 668, the RX Processor 656, and the controller/processor 659 configured to perform the functions recited by the aforementioned means.

Further disclosure is included in the Appendix.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   pruning one or more candidate frequencies relating to a possible cell reconfiguration, the pruning of one or more candidate frequencies comprising:
      selecting at least one wireless serving cell, and
      selecting, based on a data source, at least one wireless non-serving cell, the data source comprising broadcasted system information and historical information for at least one prior serving cell, wherein candidate cells are pruned based on a review of data obtained from both broadcasted system information and a local cache of historical information of prior serving cells in a radio resource control (RRC) connected mode;
   identifying a plurality of measurement objects corresponding to the selected at least one wireless serving and non-serving cells;
   performing wireless measurements based on the selected at least one wireless serving and non-serving cells and the identified measurement objects to produce at least one measured value; and
   transmitting a pruned frequency of the at least one or more candidate frequencies and the at least one measured value to a network element for use in determining channel conditions associated with the selected at least one wireless serving and non-serving cells.

2. The method of claim 1, wherein the wireless serving cell comprises a Long Term Evolution (LTE) cell, and
   wherein the selecting the at least one wireless serving and non-serving cells, the identifying, the performing and the transmitting are performed by a user equipment (UE) in the RRC connected mode.

3. The method of claim 2, wherein the historical information is stored locally in an acquisition database.

4. The method of claim 2, wherein the selecting the at least one wireless serving cell comprises determining whether carrier aggregation (CA) is enabled.

5. The method of claim 2, further comprising:
   identifying at least one measurement object corresponding to each of one or more candidate non-LTE cells in response to a determination that the UE is configured to acquire wireless service of a type provided by the one or more candidate non-LTE cells,
   wherein the performing the wireless measurements is further based on the at least one measurement object.

6. The method of claim 5, further comprising:
identifying at least one measurement object corresponding to an LTE downlink (DL) -only channel, wherein the performing the wireless measurements is further based on the at least one measurement object corresponding to the LTE DL-only channel.

7. The method of claim 5, further comprising:
identifying at least one measurement object corresponding to a measurement object identifier, wherein the performing the wireless measurements is further based on the at least one measurement object corresponding to the measurement object identifier.

8. The method of claim 5, wherein the at least one measurement object comprises a Wideband Code Division Multiple Access (WCDMA) measurement object corresponding to data from at least one of System Information Block 6 (SIB6) or a cache of prior serving cells maintained by the UE.

9. The method of claim 5, wherein the at least one measurement object comprises a plurality of GSM measurement objects identified from an absolute radio-frequency channel number (ARFCN) count from 1 to 32.

10. The method of claim 5, wherein the at least one measurement object comprises a CDMA measurement object corresponding to data from at least one of System Information Block 8 (SIB8) or a cache of prior serving cells maintained by the UE.

11. The method of claim 5, wherein the one or more candidate non-LTE cells comprises at least one of a WCDMA neighbor, a GSM neighbor, or a CDMA neighbor.

12. The method of claim 2, further comprising:
identifying at least one measurement object corresponding to an LTE downlink (DL) -only channel, wherein the performing the wireless measurements is further based on the at least one measurement object corresponding to the LTE DL-only channel.

13. The method of claim 12, further comprising:
identifying at least one measurement object corresponding to a measurement object identifier, wherein the performing the wireless measurements is further based on the at least one measurement object corresponding to the measurement object identifier.

14. The method of claim 2, further comprising:
identifying at least one measurement object corresponding to a measurement object identifier, wherein the performing the wireless measurements is further based on the at least one measurement object corresponding to the measurement object identifier.

15. The method of claim 14, wherein each of the at least one measurement object corresponding to the measurement object identifier is identified until a total count of the plurality of measurement objects reaches a predetermined number.

16. The method of claim 2, wherein the broadcasted system information comprises data from System Information Block 5 (SIB5) and the historical information comprises a cache of prior serving cells maintained by the UE.

17. The method of claim 2, wherein the at least one wireless serving cell comprises at least one of a primary cell or a secondary cell.

18. The method of claim 1, wherein the at least one wireless non-serving cell comprises at least one of an intra-frequency neighbor or an inter-frequency neighbor.

19. An apparatus for wireless communication, comprising:
a memory; and
at least one processor coupled to the memory and configured to:
pruning one or more candidate frequencies relating to a possible cell reconfiguration, the pruning of one or more candidate frequencies comprising:
selecting at least one wireless serving cell, and
selecting, based on a data source, at least one wireless non-serving cell, the data source comprising broadcasted system information and historical information for at least one prior serving cell, wherein candidate cells are pruned based on a review of data obtained from both broadcasted system information and a local cache of historical information of prior serving cells in a radio resource control (RRC) connected mode;
identify a plurality of measurement objects corresponding to the selected at least one wireless serving and non-serving cells;
perform wireless measurements based on the selected at least one wireless serving and non-serving cells and the identified measurement objects to produce at least one measured value; and
transmit a pruned frequency of the at least one or more candidate frequencies and the at least one measured value to a network element for use in determining channel conditions associated with the selected at least one wireless serving and non-serving cells.

20. The apparatus of claim 19, wherein the wireless serving cell comprises a Long Term Evolution (LTE) cell, the apparatus being configured in the RRC connected mode.

21. The apparatus of claim 20, wherein the historical information is stored locally in an acquisition database.

22. The apparatus of claim 20, wherein selecting the at least one wireless serving cell comprises determining whether carrier aggregation (CA) is enabled.

23. The apparatus of claim 20, wherein the at least one processor is further configured to:
identify at least one measurement object corresponding to each of one or more candidate non-LTE cells in response to a determination that the apparatus is configured to acquire wireless service of a type provided by the one or more candidate non-LTE cells,
wherein the performing the wireless measurements is further based on the at least one measurement object.

24. The apparatus of claim 23, wherein the at least one processor is further configured to:
identify at least one measurement object corresponding to an LTE downlink (DL) -only channel,
wherein the performing the wireless measurements is further based on the at least one measurement object corresponding to the LTE DL-only channel.

25. The apparatus of claim 24, wherein the at least one processor is further configured to:
identify at least one measurement object corresponding to a measurement object identifier,
wherein the performing the wireless measurements is further based on the at least one measurement object corresponding to the measurement object identifier.

26. The apparatus of claim 23, wherein the at least one processor is further configured to:
identify at least one measurement object corresponding to a measurement object identifier, wherein the performing the wireless measurements is further based on the at least one measurement object corresponding to the measurement object identifier.

27. The apparatus of claim 23, wherein the at least one measurement object comprises a Wideband Code Division Multiple Access (WCDMA) measurement object corresponding to data from at least one of System Information Block 6 (SIB6) or a local cache of prior serving cells.

28. The apparatus of claim 23, wherein the at least one measurement object comprises a plurality of GSM measurement objects identified from an absolute radio-frequency channel number (ARFCN) count from 1 to 32.

29. The apparatus of claim 23, wherein the at least one measurement object comprises a CDMA measurement object corresponding to data from at least one of System Information Block 8 SIB8) or a local cache of prior serving cells.

30. The apparatus of claim 23, wherein the one or more candidate non-LTE cells comprises at least one of a WCDMA neighbor, a GSM neighbor, or a CDMA neighbor.

31. The apparatus of claim 20, wherein the at least one processor is further configured to:
identify at least one measurement object corresponding to an LTE downlink (DL) - only channel,
wherein the performing the wireless measurements is further based on the at least one measurement object corresponding to the LTE DL-only channel.

32. The apparatus of claim 20, wherein the at least one processor is further configured to:
identify at least one measurement object corresponding to a measurement object identifier,
wherein the performing the wireless measurements is further based on the at least one measurement object corresponding to the measurement object identifier.

33. The apparatus of claim 32, wherein each of the at least one measurement object corresponding to the measurement object identifier is identified until a total count of the plurality of measurement objects reaches a predetermined number.

34. The apparatus of claim 20, wherein the broadcasted system information comprises data from System Information Block 5 (SIB5) and the historical information comprises a local cache of prior serving cells.

35. The apparatus of claim 19, wherein the at least one wireless serving cell comprises at least one of a primary cell or a secondary cell.

36. The apparatus of claim 19, wherein the at least one wireless non-serving cell comprises at least one of an intra-frequency neighbor or an inter-frequency neighbor.

37. An apparatus for wireless communication, comprising:
means for pruning of one or more candidate frequencies relating to a possible cell reconfiguration, the pruning of one or more candidate frequencies comprising:
selecting at least one wireless serving cell, and
selecting, based on a data source, at least one wireless non-serving cell, the data source comprising historical information for at least one prior serving cell and broadcasted system information the means for initiating pruning configured to prune candidate cells based on a review of data obtained from both broadcasted system information and a local cache of historical information of prior serving cells in a radio resource control (RRC) connected mode;
means for identifying a plurality of measurement objects corresponding to the selected at least one wireless serving and non-serving cells;
means for performing wireless measurements based on the selected at least one wireless serving and non-serving cells and the identified measurement objects to produce at least one measured value; and
means for transmitting a pruned frequency of the at least one or more candidate frequencies and the at least one measured value to a network element for use in determining channel conditions associated with the selected at least one wireless serving and non-serving cells.

38. The apparatus of claim 37, wherein the at least one wireless serving cell comprises a Long Term Evolution (LTE) cell.

39. A non-transitory computer-readable storage medium having code stored thereon for wireless communication, the code, when executed by a processor, causing the processor to perform:
pruning one or more candidate frequencies relating to a possible cell reconfiguration, the pruning of one or more candidate frequencies comprising:
selecting at least one wireless serving cell, and
selecting, based on a data source, at least one wireless non-serving cell, the data source comprising broadcasted system information and historical information for at least one prior serving cell, wherein candidate cells are pruned based on a review of data obtained from both broadcasted system information and a local cache of historical information of prior serving cells in a radio resource control (RRC) connected mode;
identifying a plurality of measurement objects corresponding to the selected at least one wireless serving and non-serving cells;
performing wireless measurements based on the selected at least one wireless serving and non-serving cells and the identified measurement objects to produce at least one measured value; and
transmitting a pruned frequency of the at least one or more candidate frequencies and the at least one measured value to a network element for use in determining channel conditions associated with the selected at least one wireless serving and non-serving cells.

40. The non-transitory computer-readable medium of claim 39, wherein the wireless serving cell comprises a Long Term Evolution (LTE) cell, and
wherein the selecting the at least one wireless serving and non-serving cells, the identifying, the performing and the transmitting are performed by a user equipment (UE) in the RRC connected mode.

41. The non-transitory computer-readable medium of claim 40, wherein the selecting the at least one wireless serving cell comprises determining whether carrier aggregation (CA) is enabled.

42. The non-transitory computer-readable medium of claim 40, the code, when executed by the processor, causing the processor to further perform:
identifying at least one measurement object corresponding to each of one or more candidate non-LTE cells in response to a determination that the UE is configured to acquire wireless service of a type provided by the one or more candidate non-LTE cells,
wherein the performing the wireless measurements is further based on the at least one measurement object.

43. The non-transitory computer-readable medium of claim 42, wherein the at least one measurement object comprises a Wideband Code Division Multiple Access (WCDMA) measurement object corresponding to data from at least one of System Information Block 6 (SIB6) or a local cache of prior serving cells.

44. The non-transitory computer-readable medium of claim 42, wherein the at least one measurement object comprises a plurality of GSM measurement objects identified from an absolute radio-frequency channel number (ARFCN) count from 1 to 32 that is found in System Information Block 7 (SIB7) or a cache of prior serving cells maintained by the UE.

45. The non-transitory computer-readable medium of claim 42, wherein the at least one measurement object comprises a CDMA measurement object corresponding to data from at least one of System Information Block 8 (SIB8) or a local cache of prior serving cells.

46. The non-transitory computer-readable medium of claim 42, wherein the one or more candidate non-LTE cells comprises at least one of a WCDMA neighbor, a GSM neighbor, or a CDMA neighbor.

47. The non-transitory computer-readable medium of claim 40, the code, when executed by the processor, causing the processor to further perform:
identifying at least one measurement object corresponding to an LTE downlink (DL) -only channel, wherein the performing the wireless measurements is further based on the at least one measurement object corresponding to the LTE DL-only channel.

48. The non-transitory computer-readable medium of claim 40, the code, when executed by the processor, causing the processor to further perform:
identifying at least one measurement object corresponding to a measurement object identifier, wherein the performing the wireless measurements is further based on the at least one measurement object corresponding to the measurement object identifier.

49. The non-transitory computer-readable medium of claim 40, wherein the broadcasted system information comprises data from System Information Block 5 (SIB5) and the historical information comprises a cache of prior serving cells maintained by the UE.

50. A user equipment, comprising:
a processing system configured to:
prune one or more candidate frequencies relating to a possible cell reconfiguration, the pruning of one or more candidate frequencies comprising:
selecting at least one wireless serving cell, and
selecting, based on a data source, at least one wireless non-serving cell, the data source comprising broadcasted system information and historical information for at least one prior serving cell, wherein candidate cells are pruned based on a review of data obtained from both broadcasted system information and a local cache of historical information of prior serving cells in a radio resource control (RRC) connected mode;
identify a plurality of LTE measurement objects corresponding to at least one LTE non-serving cell based on a review of broadcasted system information and local historical information;
perform measurements corresponding to the identified measurement objects; and
transmit a pruned frequency of the at least one or more candidate frequencies and measurement results corresponding to the identified measurement objects to a network element.

51. The user equipment of claim 50, wherein the identifying the plurality of LTE measurement objects is performed in the RRC connected mode.

52. The user equipment of claim 50, wherein the broadcasted system information comprises information in a System Information Block (SIB).

53. The user equipment of claim 50, wherein at least one of the measurement objects corresponding to the at least one LTE non-serving cell is identified on the basis of the local historical information.

54. The user equipment of claim 50, wherein the processing system is further configured to identify one or more measurement objects corresponding to at least one non-LTE cell.

55. The user equipment of claim 54, wherein the one or more measurement objects corresponding to the at least one non-LTE cell are identified on the basis of the broadcasted system information.

* * * * *